(12) United States Patent
Jung et al.

(10) Patent No.: US 12,342,396 B2
(45) Date of Patent: *Jun. 24, 2025

(54) METHOD AND APPARATUS FOR Wi-Fi CONNECTION USING Wi-Fi PROTECTED SETUP IN PORTABLE TERMINAL

(71) Applicant: Samsung Electronics Co., Ltd., Suwon-si (KR)

(72) Inventors: Bu-Seop Jung, Suwon-si (KR); Jung-Hun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,399

(22) Filed: Nov. 20, 2023

(65) Prior Publication Data

US 2024/0090051 A1    Mar. 14, 2024

Related U.S. Application Data

(63) Continuation of application No. 17/872,629, filed on Jul. 25, 2022, now Pat. No. 11,825,533, which is a (Continued)

(30) Foreign Application Priority Data

Oct. 25, 2011   (KR) .................. 10-2011-0109277

(51) Int. Cl.
*H04L 67/104*   (2022.01)
*H04W 8/00*   (2009.01)
(Continued)

(52) U.S. Cl.
CPC .......... *H04W 76/11* (2018.02); *H04L 67/1044* (2013.01); *H04W 8/005* (2013.01);
(Continued)

(58) Field of Classification Search
CPC .... H04W 76/021; H04W 8/005; H04W 84/12
See application file for complete search history.

(56) References Cited

U.S. PATENT DOCUMENTS 7,461,130 B1   12/2008   Abdelaziz et al.
7,505,596 B2   3/2009   Duplessis et al.
(Continued)

OTHER PUBLICATIONS

What is Wi-Fi?—An IT Definition From Webopedia.com, Sep. 25, 2012, https://web.archive.org/web/20110810013514/http://www.webopedia.com/TERM/W/Wi_Fi.html, p. 1.
(Continued)

*Primary Examiner* — Stephen T Gundry
(74) *Attorney, Agent, or Firm* — Jefferson IP Law, LLP

(57) ABSTRACT

A method and an apparatus for Wi-Fi connection based on Wi-Fi Protected Setup (WPS) in a portable terminal are provided. The method includes entering a group owner mode of Wi-Fi Direct when enabling of WPS is requested, after entering the group owner mode, entering a WPS session mode where the portable terminal is operable in a WPS registrar mode, determining whether an Access Point (AP) whose WPS session of the WPS registrar mode is enabled or a device whose group owner mode is enabled, exists nearby, and when an AP whose WPS registrar mode is enabled is discovered, disabling the WPS registrar mode and the group owner mode, enabling a WPS session where the portable terminal is to operate in a WPS enrollee mode, and accessing the discovered AP.

19 Claims, 2 Drawing Sheets

Related U.S. Application Data continuation of application No. 16/859,287, filed on Apr. 27, 2020, now Pat. No. 11,399,398, which is a continuation of application No. 16/042,639, filed on Jul. 23, 2018, now Pat. No. 10,638,523, which is a continuation of application No. 14/837,643, filed on Aug. 27, 2015, now Pat. No. 10,034,315, which is a continuation of application No. 13/660,439, filed on Oct. 25, 2012, now Pat. No. 9,137,306.

(51) Int. Cl.
*H04W 12/06* (2021.01)
*H04W 48/16* (2009.01)
*H04W 76/11* (2018.01)
*H04W 84/02* (2009.01)
*H04W 84/12* (2009.01)

(52) U.S. Cl.
CPC ........... *H04W 12/06* (2013.01); *H04W 48/16* (2013.01); *H04W 84/02* (2013.01); *H04W 84/12* (2013.01)

(56) References Cited

U.S. PATENT DOCUMENTS

| | | |
|---|---|---|
| 8,300,546 B2 | 10/2012 | Shibuya et al. |
| 8,391,260 B1 | 3/2013 | Kopikare et al. |
| 8,462,734 B2 | 6/2013 | Laine et al. |
| 8,494,164 B2* | 7/2013 | Kweon ............... H04W 48/16 380/270 |
| 8,531,989 B2 | 9/2013 | Radhakrishnan et al. |
| 8,554,970 B2 | 10/2013 | Suumaeki et al. |
| 8,565,132 B2* | 10/2013 | Shibuya ............ H04W 12/069 370/310 |
| 8,572,698 B1 | 10/2013 | Kandasamy |
| 8,600,380 B2* | 12/2013 | Choi .................... H04W 76/14 713/168 |
| 8,621,071 B1 | 12/2013 | Scofield et al. |
| 8,625,552 B2 | 1/2014 | Gupta et al. |
| 8,634,771 B2 | 1/2014 | Hassan et al. |
| 8,639,220 B2 | 1/2014 | Choi et al. |
| 8,660,031 B2 | 2/2014 | Goto |
| 8,711,825 B1 | 4/2014 | Kopikare et al. |
| 8,743,398 B2* | 6/2014 | Park ...................... H04W 12/06 358/1.15 |
| 8,751,803 B2* | 6/2014 | Lee ....................... H04W 12/04 713/168 |
| 8,768,323 B2 | 7/2014 | Liu et al. |
| 8,774,144 B2 | 7/2014 | Nogawa |
| 8,787,222 B2 | 7/2014 | Yoon et al. |
| 8,817,304 B2 | 8/2014 | Shibata |
| 8,824,437 B2* | 9/2014 | Kubota ................ H04W 84/20 370/338 |
| 8,830,866 B2* | 9/2014 | Bradley ................ H04W 12/08 370/254 |
| 8,856,290 B2 | 10/2014 | Couto et al. |
| 8,879,471 B2 | 11/2014 | Kneckt et al. |
| 8,886,833 B1 | 11/2014 | Kopikare et al. |
| 8,892,722 B1 | 11/2014 | Kopikare et al. |
| 8,908,695 B2 | 12/2014 | Naito et al. |
| 8,909,197 B2* | 12/2014 | Choi ..................... H04L 67/51 455/411 |
| 8,917,651 B2 | 12/2014 | Dattagupta |
| 8,929,276 B2 | 1/2015 | Du et al. |
| 8,929,348 B2* | 1/2015 | Park ..................... H04W 76/14 455/446 |
| 8,929,822 B2 | 1/2015 | Jung et al. |
| 8,941,854 B2 | 1/2015 | Park et al. |
| 8,948,382 B2 | 2/2015 | Hassan et al. |
| 8,949,386 B2 | 2/2015 | Goto |
| 8,954,502 B1 | 2/2015 | Kopikare et al. |
| 8,965,283 B2 | 2/2015 | Wentink et al. |
| 9,009,792 B1 | 4/2015 | Scofield et al. |
| 9,019,878 B2 | 4/2015 | Anders, Jr. et al. |
| 9,031,507 B2 | 5/2015 | Lee |
| 9,043,395 B2 | 5/2015 | Thangadorai |
| 9,052,862 B2 | 6/2015 | Shibata |
| 9,071,517 B2 | 6/2015 | Radhakrishnan et al. |
| 9,078,087 B2 | 7/2015 | Yoon |
| 9,100,442 B2 | 8/2015 | Park |
| 9,106,308 B2* | 8/2015 | Nogawa ................ H04W 12/06 |
| 9,125,238 B2 | 9/2015 | Ejima |
| 9,137,306 B2 | 9/2015 | Jung et al. |
| 9,137,751 B2 | 9/2015 | Huang |
| 9,167,608 B2* | 10/2015 | Yoon ..................... H04W 76/10 |
| 9,215,657 B1 | 12/2015 | Kopikare et al. |
| 9,258,768 B2 | 2/2016 | Jung et al. |
| 9,264,490 B2 | 2/2016 | Qi et al. |
| 9,288,228 B2 | 3/2016 | Suumaki |
| 9,294,278 B2 | 3/2016 | Yi et al. |
| 9,307,022 B2 | 4/2016 | Lee |
| 9,338,633 B2 | 5/2016 | Choi et al. |
| 9,369,947 B2 | 6/2016 | Lee et al. |
| 9,392,619 B2 | 7/2016 | Park |
| 9,392,630 B2 | 7/2016 | Yi et al. |
| 9,408,058 B2* | 8/2016 | Jung ..................... H04W 8/005 |
| 9,480,076 B2* | 10/2016 | Jung ..................... H04L 67/61 |
| 9,497,788 B2 | 11/2016 | Goto |
| 9,504,069 B2 | 11/2016 | Jeong et al. |
| 9,554,263 B2 | 1/2017 | Kim et al. |
| 9,608,985 B2 | 3/2017 | Park |
| 9,614,856 B2 | 4/2017 | Park |
| 9,736,691 B2 | 8/2017 | Choi et al. |
| 2008/0177822 A1 | 7/2008 | Yoneda |
| 2008/0240068 A1 | 10/2008 | Ishimoto |
| 2010/0146129 A1 | 6/2010 | Nakahara |
| 2010/0189012 A1 | 7/2010 | Shibuya et al. |
| 2010/0260069 A1 | 10/2010 | Sakamoto et al. |
| 2010/0291954 A1 | 11/2010 | Nakajima |
| 2010/0299730 A1 | 11/2010 | Hamachi |
| 2010/0322213 A1 | 12/2010 | Liu et al. |
| 2010/0332666 A1 | 12/2010 | Hamachi |
| 2011/0034127 A1 | 2/2011 | Wentink et al. |
| 2011/0055409 A1 | 3/2011 | Tsai |
| 2011/0058536 A1 | 3/2011 | Tsuchiya et al. |
| 2011/0082905 A1 | 4/2011 | Wentink et al. |
| 2011/0082939 A1 | 4/2011 | Montemurro et al. |
| 2011/0082940 A1 | 4/2011 | Montemurro et al. |
| 2011/0103264 A1 | 5/2011 | Wentink |
| 2011/0116415 A1 | 5/2011 | Naito et al. |
| 2011/0122835 A1 | 5/2011 | Naito et al. |
| 2011/0149816 A1 | 6/2011 | Saito et al. |
| 2011/0182207 A1 | 7/2011 | Naito et al. |
| 2011/0188391 A1 | 8/2011 | Sella et al. |
| 2011/0188657 A1* | 8/2011 | Kweon ................ H04W 48/16 380/270 |
| 2011/0202643 A1 | 8/2011 | Goto |
| 2011/0211219 A1* | 9/2011 | Bradley ................ G06F 3/12 358/1.15 |
| 2011/0222518 A1 | 9/2011 | Ota et al. |
| 2011/0230139 A1 | 9/2011 | Nakahara |
| 2011/0243033 A1* | 10/2011 | Won ..................... H04W 48/20 370/254 |
| 2011/0244897 A1 | 10/2011 | Shibuya |
| 2011/0268027 A1 | 11/2011 | Nogawa |
| 2011/0275316 A1* | 11/2011 | Suumaki ............... H04L 69/24 455/41.1 |
| 2011/0280233 A1 | 11/2011 | Choi et al. |
| 2011/0281556 A1* | 11/2011 | Choi .................... H04W 76/14 455/411 |
| 2011/0281557 A1 | 11/2011 | Choi et al. |
| 2011/0282989 A1 | 11/2011 | Geirhofer et al. |
| 2011/0292300 A1 | 12/2011 | Nagara et al. |
| 2011/0294474 A1 | 12/2011 | Barany et al. |
| 2011/0296178 A1* | 12/2011 | Lee ...................... H04W 12/35 713/168 |
| 2011/0317680 A1 | 12/2011 | Goto |
| 2012/0014299 A1 | 1/2012 | Yoon et al. |
| 2012/0033568 A1* | 2/2012 | Park .................... H04W 76/14 370/252 |
| 2012/0036557 A1 | 2/2012 | Li |
| 2012/0042158 A1 | 2/2012 | Park |

(56) References Cited

U.S. PATENT DOCUMENTS

| | | | |
|---|---|---|---|
| 2012/0044522 A1* | 2/2012 | Park | H04W 12/06 370/254 |
| 2012/0051244 A1 | 3/2012 | Nagara | |
| 2012/0083208 A1 | 4/2012 | Giles et al. | |
| 2012/0096186 A1 | 4/2012 | Chang et al. | |
| 2012/0099566 A1 | 4/2012 | Laine et al. | |
| 2012/0100803 A1* | 4/2012 | Suumaki | H04W 12/03 455/41.1 |
| 2012/0102207 A1 | 4/2012 | Salowey et al. | |
| 2012/0106449 A1* | 5/2012 | Shibuya | H04W 12/069 370/328 |
| 2012/0106475 A1* | 5/2012 | Jung | H04L 67/61 370/329 |
| 2012/0120934 A1* | 5/2012 | Cho | H04W 40/24 370/338 |
| 2012/0133971 A1 | 5/2012 | Park | |
| 2012/0134349 A1 | 5/2012 | Jung et al. | |
| 2012/0155643 A1 | 6/2012 | Hassan et al. | |
| 2012/0166671 A1 | 6/2012 | Qi et al. | |
| 2012/0182979 A1 | 7/2012 | Vedantham et al. | |
| 2012/0218918 A1 | 8/2012 | Takae et al. | |
| 2012/0224569 A1 | 9/2012 | Kubota | |
| 2012/0227090 A1 | 9/2012 | Shibuya | |
| 2012/0230221 A1 | 9/2012 | Radhakrishnan et al. | |
| 2012/0265913 A1 | 10/2012 | Suumaki et al. | |
| 2012/0278389 A1 | 11/2012 | Thangadorai | |
| 2012/0317194 A1 | 12/2012 | Tian | |
| 2012/0320414 A1 | 12/2012 | Shibata | |
| 2012/0320886 A1 | 12/2012 | Anders, Jr. et al. | |
| 2012/0322368 A1 | 12/2012 | Desai et al. | |
| 2013/0034023 A1 | 2/2013 | Jung | |
| 2013/0034046 A1 | 2/2013 | Ishii et al. | |
| 2013/0036231 A1 | 2/2013 | Suumaki | |
| 2013/0039358 A1 | 2/2013 | Ejima | |
| 2013/0040576 A1 | 2/2013 | Yoon | |
| 2013/0044739 A1 | 2/2013 | Huang | |
| 2013/0045678 A1 | 2/2013 | Lee | |
| 2013/0057897 A1 | 3/2013 | Park et al. | |
| 2013/0057898 A1 | 3/2013 | Park et al. | |
| 2013/0057908 A1 | 3/2013 | Park | |
| 2013/0057912 A1 | 3/2013 | Park | |
| 2013/0057913 A1 | 3/2013 | Park | |
| 2013/0065538 A1 | 3/2013 | Kim | |
| 2013/0065627 A1 | 3/2013 | Jung et al. | |
| 2013/0089001 A1 | 4/2013 | Dattagupta | |
| 2013/0094484 A1 | 4/2013 | Kneckt et al. | |
| 2013/0100855 A1 | 4/2013 | Jung et al. | |
| 2013/0102260 A1 | 4/2013 | Lee et al. | |
| 2013/0103807 A1 | 4/2013 | Couto et al. | |
| 2013/0107796 A1 | 5/2013 | Du et al. | |
| 2013/0182686 A1 | 7/2013 | Vedantham et al. | |
| 2013/0227152 A1 | 8/2013 | Lee et al. | |
| 2013/0282914 A1 | 10/2013 | Jeong et al. | |
| 2013/0322295 A1 | 12/2013 | Radhakrishnan et al. | |
| 2013/0346553 A1 | 12/2013 | Shin et al. | |
| 2014/0091987 A1 | 4/2014 | Lee et al. | |
| 2014/0113595 A1 | 4/2014 | Choi et al. | |
| 2014/0126565 A1 | 5/2014 | Goto | |
| 2014/0206407 A1 | 7/2014 | Kim et al. | |
| 2014/0226639 A1 | 8/2014 | Yi et al. | |
| 2014/0258550 A1 | 9/2014 | Chhabra et al. | |
| 2014/0287695 A1 | 9/2014 | Nogawa | |
| 2014/0301552 A1 | 10/2014 | Yi et al. | |
| 2014/0307725 A1 | 10/2014 | Yoon et al. | |
| 2014/0314059 A1 | 10/2014 | Yoon et al. | |
| 2014/0320925 A1 | 10/2014 | Shibata | |
| 2015/0058934 A1* | 2/2015 | Choi | H04W 12/06 726/3 |
| 2015/0105023 A1 | 4/2015 | Jung et al. | |
| 2015/0124761 A1 | 5/2015 | Goto | |
| 2015/0229612 A1 | 8/2015 | Hassan et al. | |
| 2015/0244793 A1 | 8/2015 | Lee | |
| 2015/0281915 A1 | 10/2015 | Yoon | |
| 2016/0105842 A1* | 4/2016 | Goto | H04W 24/02 370/338 |
| 2016/0157289 A1 | 6/2016 | Jung et al. | |
| 2016/0345155 A1 | 11/2016 | Lee et al. | |
| 2017/0071020 A1 | 3/2017 | Jeong et al. | |
| 2017/0127282 A1 | 5/2017 | Hassan et al. | |

OTHER PUBLICATIONS

Wi-Fi Simple Configuration, Feb. 9, 2010, Published by the Wi-Fi Alliance, Version 2.0 r42 unofficial draft-01, p. 1.
Wi-Fi Peer-to-Peer (P2P) Technical Specification, 2010, Published by the Wi-Fi Alliance, Version 1.1, p. 1.
Wi-Fi Alliance Technical Committee 4 P2P Task Group, 'Wi-Fi Peer-to-Peer(P2P) Technical Specification' V1.2, 2010.

* cited by examiner

METHOD AND APPARATUS FOR Wi-Fi CONNECTION USING Wi-Fi PROTECTED SETUP IN PORTABLE TERMINAL

CROSS-REFERENCE TO RELATED APPLICATION(S)

This application is a continuation application of prior application Ser. No. 17/872,629, filed on Jul. 25, 2022, which has issued as U.S. Pat. No. 11,825,533 on Nov. 21, 2023; which is a continuation application of prior application Ser. No. 16/859,287, filed on Apr. 27, 2020, which has issued as U.S. Pat. No. 11,399,398 on Jul. 26, 2022, which is a continuation application of prior application Ser. No. 16/042,639, filed on Jul. 23, 2018, which has issued as U.S. Pat. No. 10,638,523 on Apr. 28, 2020, which is a continuation application of prior application Ser. No. 14/837,643, filed on Aug. 27, 2015, which has issued as U.S. Pat. No. 10,034,315 on Jul. 24, 2018, which is a continuation application of prior application Ser. No. 13/660,439, filed on Oct. 25, 2012, which issued as U.S. Pat. No. 9,137,306 on Sep. 15, 2015, and was based on and claimed priority under 35 U.S.C § 119(a) of a Korean patent application filed on Oct. 25, 2011 in the Korean Intellectual Property Office and assigned Serial number 10-2011-0109277, the disclosure of which is incorporated by reference herein in its entirety.

BACKGROUND

1. Field

The present invention relates to wireless communication. More particularly, the present invention relates to a method and an apparatus for allowing an easy connection among devices supporting Wireless-Fidelity (Wi-Fi) communication using Wi-Fi Protected Setup (WPS).

2. Description of Related Art

Wireless communication of the related art with Wi-Fi connection is mainly aimed to allow Wi-Fi-enabled devices to wirelessly perform communication through Access Points (APs), thus lacking the consideration of direct communication among Wi-Fi-enabled devices.

Taking into account that legacy Wi-Fi does not smoothly support direct communication among devices, the Wi-Fi Alliance has proposed a new feature called Wi-Fi Direct or Wi-Fi Peer to Peer (P2P).

Wi-Fi Direct is compatible with legacy Wi-Fi, and provides a function (e.g., P2P communication function) for allowing Wi-Fi devices to directly access each other for communication even without APs.

Because Wi-Fi Direct has been proposed taking into account the compatibility with Wi-Fi of the related art (i.e., legacy Wi-Fi), legacy Wi-Fi devices basically support WPS connection.

WPS connection allows devices attempting Wi-Fi connection to easily achieve Wi-Fi wireless communication through a button input by a Push Button Configuration (PBC) scheme or a Personal Identification Number (PIN) information input by a PIN scheme.

If a WPS session is enabled, a device attempting Wi-Fi connection determines the presence of APs through frequency and channel scanning, starts a WPS registration protocol with an AP whose WPS session is enabled, among the discovered APs, acquires credentials (e.g., Service Set IDentifier (SSID), Security Info, Network Key, and the like) of the AP, and automatically accesses the AP using the acquired credentials.

Advantageously, this WPS connection allows users to conveniently enjoy Wi-Fi wireless communication. Thus, supporting WPS connection not only for legacy Wi-Fi but also for Wi-Fi Direct may increase the convenience of using Wi-Fi Direct.

However, Wi-Fi Direct may support only devices complying with the Institute of Electrical and Electronics Engineers (IEEE) 802.11g standard or more (e.g., IEEE 802.11g or IEEE 802.11n). Hence, devices supporting only legacy Wi-Fi (e.g., devices complying with only IEEE 802.11b) may not support Wi-Fi Direct.

In this way, not all Wi-Fi devices may support Wi-Fi Direct. Thus, in order to support connection with WPS buttons even for Wi-Fi Direct connection, a WPS button for legacy Wi-Fi connection and a WPS button for Wi-Fi Direct connection need to be provided separately.

However, if WPS buttons for use of a legacy Wi-Fi function (e.g., wireless communication through AP access) and a Wi-Fi Direct function (e.g., P2P communication among Wi-Fi devices) are provided separately, the original intent to use the legacy Wi-Fi function or the Wi-Fi Direct function through a simple procedure may not be met. In addition, it may be convenient for users to use a sort of integrated Wi-Fi function, in which the users may select any one of legacy Wi-Fi connection and Wi-Fi Direct connection depending on the characteristics of the device corresponding to a connection target, by simply selecting one WPS button.

Therefore, a need exists for a WPS connection scheme capable of supporting both legacy Wi-Fi connection and Wi-Fi Direct connection by simply enabling WPS connection regardless of the Wi-Fi support standard and the properties of a Wi-Fi device.

SUMMARY

Aspects of the present invention are to address at least the above-mentioned problems and/or disadvantages and to provide at least the advantages described below. Accordingly, an aspect of the present invention is to provide a method and an apparatus for applying a Wireless-Fidelity (Wi-Fi) Protected Setup (WPS) connection scheme, which was applied only to legacy Wi-Fi connection, even to Wi-Fi Direct connection, and allowing any selected one of legacy Wi-Fi and Wi-Fi Direct to be automatically connected depending on a type of a device corresponding to a connection target only with one WPS connection request menu (e.g., a WPS button of a Push Button Configuration (PBC) connection). In other words, an aspect of the present invention is to provide a WPS connection scheme capable of supporting both legacy Wi-Fi connection and Wi-Fi Direct connection by simply enabling WPS connection regardless of the Wi-Fi support standard and the properties of a Wi-Fi device.

In accordance with one aspect of the present invention, a method for connecting to a Wi-Fi in an electronic device is provided. The method includes entering a group owner mode of a Wi-Fi Peer-to-Peer (P2P) if a Wi-Fi connection is requested, discovering an external device whose group owner mode is enabled, determining the group owner of Wi-Fi P2P from among the electronic device and the discovered external device, and connecting to a Wi-Fi P2P group based on a result of the determining of the Wi-Fi P2P group owner.

In accordance with another aspect of the present invention, an apparatus for connecting to a Wi-Fi in an electronic device is provided. The apparatus includes a communication module, and a controller operatively coupled with the communication module. The controller is configured to enter a group owner mode of Wi-Fi P2P if a Wi-Fi connection is requested, discover an external device whose group owner mode is enabled, determine the group owner of Wi-Fi P2P from among the electronic device and the discovered external device, and connect to a Wi-Fi P2P group based on a result of the determining of the Wi-Fi P2P group owner.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
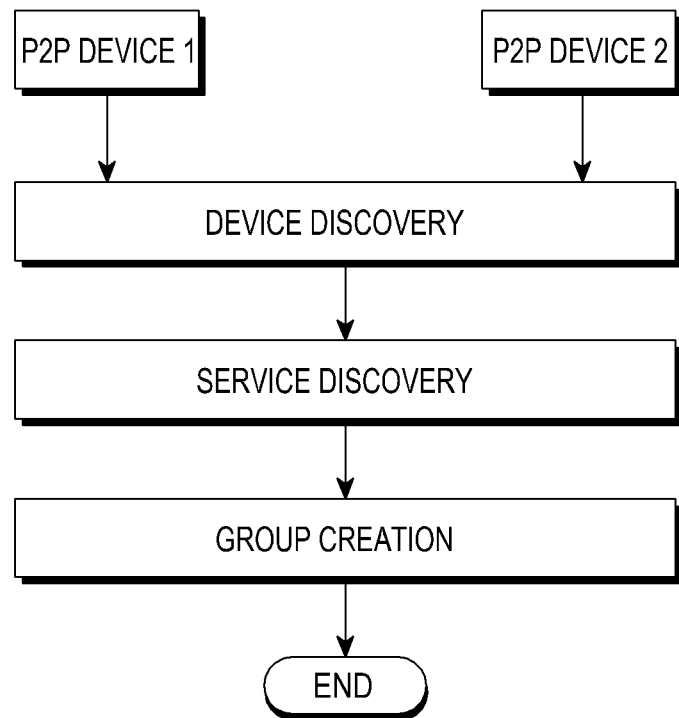
FIG. 1 is a flowchart schematically illustrating a process of creating a Peer to Peer (P2P) group by executing a Wi-Fi P2P function according to an exemplary embodiment of the present invention.
Figure 2:
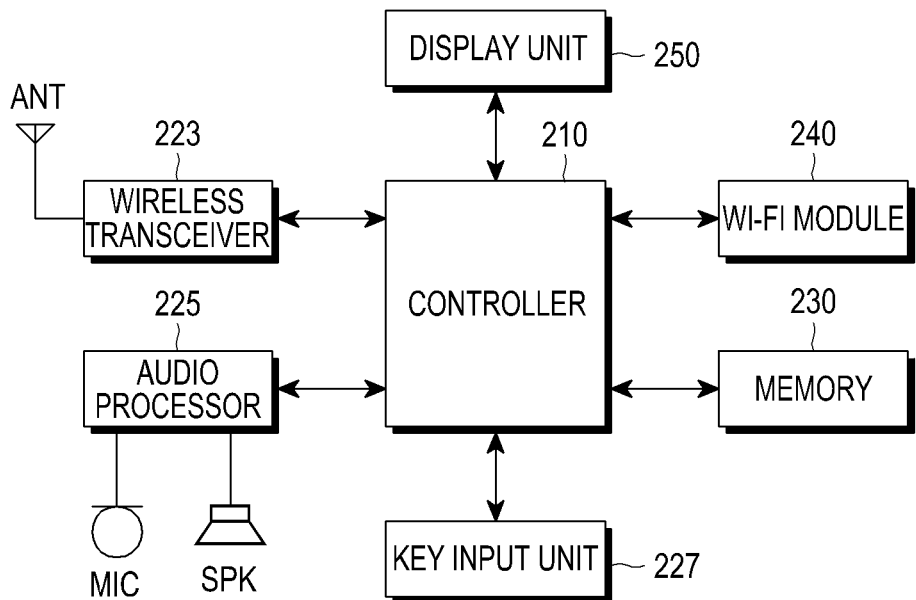
FIG. 2 is a block diagram of a portable terminal according to an exemplary embodiment of the present invention, in which the portable terminal functions as a Wi-Fi device.
Figure 3:
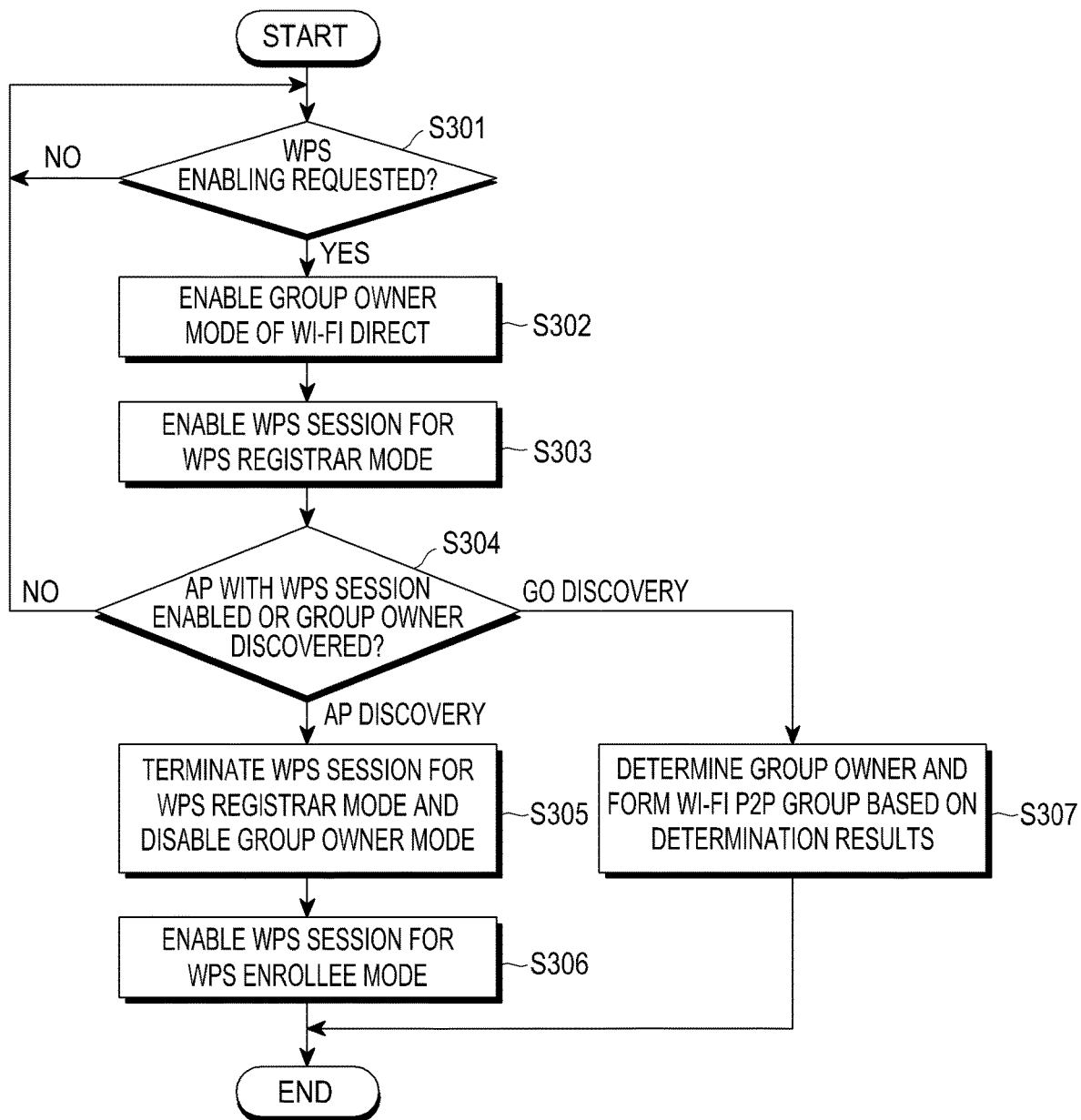
FIG. 3 is a flowchart illustrating a process of connecting Wi-Fi upon Wi-Fi Protected Setup (WPS) enabling request according to an exemplary embodiment of the present invention.

FIGS. 1 through 3, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a flowchart schematically illustrating a process of creating a Peer to Peer (P2P) group by executing a Wi-Fi P2P function according to an exemplary embodiment of the present invention.

Referring to FIG. 1, devices (e.g., a Peer to Peer (P2P) device 1 and a P2P device 2) supporting Wi-Fi Direct may create a Wi-Fi P2P group.

Prior to a description of an exemplary embodiment of the present invention for supporting both legacy Wi-Fi connection and Wi-Fi Direction connection through Wi-Fi Protected Setup (WPS) connection, a process of creating a Wi-Fi P2P group based on Wi-Fi Direct will be described below. Creation (or formation) of a Wi-Fi P2P group may be achieved through three processes: Device Discovery, Service Discovery, and Group Creation. These processes will be described in order below.

Device Discovery

A device discovery process is a procedure needed when Wi-Fi devices (e.g., P2P devices 1 and 2) identify each other and configure a connection to create a Wi-Fi P2P group based on Wi-Fi Direct.

A Wi-Fi P2P device (e.g., a P2P device 1 or a P2P device 2 shown in FIG. 1), which has entered a menu where it desires to use a Wi-Fi Direct function (or a Wi-Fi P2P function) or has entered a device discovery mode as a predefined application runs, discovers its surrounding Wi-Fi devices by repeating channel scan, listen, and search functions of the Institute of Electrical and Electronics Engineers (IEEE) 802.11 standard at stated periods of time.

The basic operation of the device discovery procedure performed in a process of creating a Wi-Fi P2P group is performed by exchanging Probe Request and Probe Response messages of an IEEE 802.11 Medium Access Control (MAC) protocol. Probe Request includes information, such as P2P Information Element (IE), Wi-Fi Simple Configuration (WSC) IE and Supplemental Registration (Supp Reg) IE, and Probe Response includes information, such as P2P IE, WSC IE, Robust Security Network (RSN) IE and Supp Reg IE.

Service Discovery

Service discovery may be optionally performed between the above-described device discovery process and a group creation process described below. The service discovery process is performed to provide a function in which each Wi-Fi device supporting Wi-Fi Direct exchanges information about its supportable services by identifying supportable service protocols and services through an exchange of request and response messages.

For example, assuming that the P2P device 1 is a camera and the P2P device 2 is a printer, if a user of the P2P device 1 wants to print out a photo, the P2P device 1 may determine whether a photo output function of the P2P device 2 is available, through service discovery, because it needs to determine whether the P2P device 2 supports a photo output function.

Group Creation

To create a Wi-Fi P2P group of Wi-Fi Direct, Wi-Fi devices (e.g., P2P device 1 and P2P device 2) perform Provision Discovery, which is one of the important features defined in Wi-Fi Direct standard.

To use a Wi-Fi Direct function, the P2P devices basically operate based on WSC, e.g., operate based on WPS. WSC support of connection devices was optional in the Wi-Fi standard of the related art, but it is mandatory in the Wi-Fi Direct standard.

WPS, one of some WSC standards, is classified into a Push Button Configuration (PBC) scheme where a button should be pushed and a Personal Identification Number (PIN) scheme where a PIN number should be input. Inconveniently, for both the PBC scheme and the PIN scheme, their settings should be completed within 120 seconds. For example, in the case of the PBC scheme, a WSC registration protocol starts only when a WPS button is input in another device within 120 seconds after a wireless connection was requested in one device by the PBC scheme, and the devices exchange a Service Set Identifier (SSID) and credential (which is the sum of cryptographic information and includes information, such as Authentication type, encryption type, network key, SSID, and the like) needed for connection.

The standard newly defined in Wi-Fi Direct to relieve these inconveniences of the WSC of the related art (or WPS) is Provision Discovery, in which when a predefined Wi-Fi P2P device (e.g., P2P device 1) attempts a connection by the WSC of the related art (i.e., a PBC scheme or a PIN scheme) after discovering another Wi-Fi P2P device (e.g., P2P device 2), it informs another Wi-Fi P2P device's user of its connection attempt by sending a WSC Method message. The WSC Method message is classified into different types: a PBC, a PIN from a display unit, and a PIN from a keypad. The PBC may notify another Wi-Fi P2P device's user of a request for Wi-Fi Direct connection when another Wi-Fi P2P device's user receives a button input, and a PIN from a display unit and a PIN from a keypad may notify another Wi-Fi P2P device's user of a request for Wi-Fi Direct connection by an event where a PIN number is displayed or input on another Wi-Fi P2P device.

If Provision Discovery is completed as users of the P2P device 1 and the P2P device 2 accept the Wi-Fi Direct connection, a Group Owner Negotiation process is performed between the Wi-Fi devices. Since Wi-Fi Direct needs to determine (or set) a Group Owner (GO) that will play a central role in a created Wi-Fi P2P group, a Group Owner Negotiation process of determining a Wi-Fi device that will serve as GO is needed for use of the Wi-Fi P2P function. The Group Owner Negotiation process is performed by exchange of GO Negotiation Request, GO Negotiation Response, and GO Negotiation Confirm frames. GO Negotiation Request and GO Negotiation Response include P2P IE information and WSC IE information, respectively. A field of P2P IE includes information, such as P2P Capability, P2P Device Info, Group Owner Intent, Configuration Timeout, Listen Channel, Extended Listen Timing, Intended P2P Interface Address, Channel List, and Operating Channel attributes. A field of WSC-IE includes information, such as DEVICE PASSWORD ID, MANUFACTURER, MODEL NAME, MODEL NUMBER, SERIAL NUMBER, and DEVICE NAME.

The P2P device 1 and the P2P device 2 compare Group Owner Intent included in P2P IE. A device with greater Group Owner Intent is determined as GO, while a device with less Group Owner Intent is determined as a Group Client (GC). If the P2P device 1 and the P2P device 2 are determined as GO and GC, respectively, the Group Owner Negotiation process is completed. If Provisioning, in which the device set as GO operates as a WSC registrar and the device set as GC operates as a WSC enrollee and they exchange credentials with each other, is completed, the group setup process for forming a Wi-Fi P2P group is completed.

Thereafter, if the group forming process is completed, the GO device shifts to an operating channel and starts its role as GO, and the GC device accesses GO based on the credentials identified through Provisioning. Finally, the two devices are connected to the Wi-Fi P2P group.

FIG. 2 is a block diagram of a portable terminal according to an exemplary embodiment of the present invention, in which the portable terminal functions as a Wi-Fi device.

In an exemplary embodiment of the present invention, a portable terminal is a mobile electronic device that a user may easily carry with him or her, and may include video phones, cell phones, smart phones, International Mobile Telecommunication 2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Book terminals, portable computers (e.g., notebook computers, tablet computers, and the like), and digital cameras.

Referring to FIG. 2, a wireless transceiver 223 includes a Radio Frequency (RF) unit and a modulator/demodulator (modem). The RF unit includes an RF transmitter for up-converting a frequency of transmission signals and amplifying the up-converted signals, and an RF receiver for low-noise-amplifying received signals and down-converting a frequency of the amplified signals. The modem includes a transmitter for coding and modulating transmission signals, and a receiver for demodulating and decoding signals received from the RF unit.

An audio processor 225 may include a coder/decoder (codec), and the codec includes a data codec and an audio codec. The data codec processes data signals, such as packet data, while the audio codec processes audio signals, such as voice and multimedia files. The audio processor 225 converts digital audio signals received from the modem into analog audio signals by means of the audio codec, and plays the analog audio signals using a speaker SPK. The audio processor 225 converts analog audio signals picked up by a microphone MIC into digital audio signals by means of the audio codec, and transfers the digital audio signals to the modem. The codec may be provided separately, or may be included in a controller 210.

A key input unit 227 may include alphanumeric keys needed to input alphanumeric information and function keys needed to set various functions, or may include a touchpad or the like. When a display unit 250 has a capacitive or resistive touch screen, the key input unit 227 may include a minimum number of predefined keys, and the display unit 250 may replace part of the key input function of the key input unit 227.

A memory 230 may include a program memory and a data memory. The program memory stores programs for controlling the overall operation of the portable terminal. The memory 230 may further include an external memory, such as Compact Flash (CF), Secure Digital (SD), Micro Secure Digital (Micro-SD), Mini Secure Digital (Mini-SD), Extreme Digital (xD), and Memory Stick. In addition, the memory 230 may include a disk, such as a Hard Disk Drive (HDD) and a Solid State Disk (SSD).

A Wi-Fi module 240 provides a short-range wireless communication function based on the IEEE 802.11 standard. In accordance with an exemplary embodiment of the present invention, the Wi-Fi module 240 meets Wi-Fi Direct standard, and thus may provide a function in which portable terminals in a Wi-Fi P2P group formed by Wi-Fi Direct may exchange data with each other. The Wi-Fi module 240 may also provide the legacy Wi-Fi function (e.g., a function of performing wireless communication by accessing an Access Point (AP)) because it meets the Wi-Fi Direct standard.

The display unit 250 may include a Liquid Crystal Display (LCD) or an Organic Light Emitting Diode (OLED), which is classified into Passive Matrix OLED and Active Matrix OLED, and outputs various display information generated in the portable terminal. The display unit 250 includes a capacitive or resistive touch screen and may serve as an input unit for controlling the portable terminal, together with the key input unit 227.

The controller 210 may control the overall operation of the portable terminal based on a user input received through the key input unit 227 and/or the display unit 250. In accordance with an exemplary embodiment of the present invention, the controller 210 may perform a series of corresponding operations associated with a process of entering a group owner mode of Wi-Fi Direct if enabling of WPS is requested, a process of entering a WPS session mode where the portable terminal is operable in a WPS registrar mode, after entering the group owner mode, determining whether an AP whose WPS session of the WPS registrar mode is enabled or a device whose group owner mode is enabled, exists nearby, and a process of, if an AP whose WPS registrar mode is enabled is discovered, disabling the WPS registrar mode and the group owner mode, enabling a WPS session where the portable terminal is to operate in a WPS enrollee mode, and accessing the discovered AP.

FIG. 3 is a flowchart illustrating a process of connecting Wi-Fi upon WPS enabling request according to an exemplary embodiment of the present invention.

Referring to FIG. 3, in steps S301 through S303, if it is determined that enabling of WPS is requested, the controller 210 enters a Group Owner mode of Wi-Fi Direct, and enters a WPS session mode where it can operate in a WPS registrar mode.

In an exemplary embodiment of the present invention, Wi-Fi connection is classified into legacy Wi-Fi for performing wireless communication through an access to AP, and Wi-Fi Direct capable of forming a Wi-Fi P2P group with another Wi-Fi device.

If it is determined that a user has requested enabling of WPS by a WPS PBC button or a WPS PIN input through a key input on the key input unit 227 or the display unit 250, the controller 210 enables GO mode of Wi-Fi Direct and acquires GO rights. After acquiring GO rights, the controller 210 enables a WPS session so that the portable terminal may operate in a WPS registrar mode during Wi-Fi connection.

For example, by entering a WPS session mode where it may operate in a WPS registrar mode, the controller 210 performs a process for providing various communication parameters (e.g., an SSID (or network identifier), a frequency channel, an authentication type, an encryption type, a network key, etc.) defined by the IEEE 802.11 standard, to another device.

In steps S304 through S306, the controller 210 determines whether an AP whose WPS session of the WPS registrar mode is enabled or a device (e.g., a portable terminal) whose group owner mode is enabled, exists nearby. If an AP whose WPS registrar mode is enabled is discovered, the controller 210 terminates the WPS session where it operates in the WPS registrar mode, disables the GO mode, and enables the WPS session where it operates in a WPS enrollee mode.

In step S304, the controller 210 may discover an AP (e.g., a Wi-Fi device serving as an AP) whose WPS session of the WPS registrar mode is enabled, by determining various communication parameters (e.g., an SSID (or a network identifier), a frequency channel, an authentication type, an encryption type, an encryption key, etc.) defined by the IEEE 802.11 standard by discovering Wi-Fi-enabled devices using the channel scan method (e.g., IEEE 802.11 scan mode) defined in the IEEE 802.11 standard.

In addition, in step S304, the controller 210 may determine a device having GO rights (or a device whose GO mode is enabled) through exchange of the Probe Request and Probe Response messages of Wi-Fi Direct, described in conjunction with FIG. 1. This is because as described below, a discovered device may have a characteristic prefix in SSID when it has GO rights.

If it is determined in step S304 that an AP, whose WPS session of the WPS registrar mode is enabled, has been discovered, the controller 210 disables the WPS session and GO mode which were enabled in steps S302 and S303. Thereafter, in steps S305 and S306, the controller 210 enables a WPS session where a Wi-Fi device (e.g., a portable terminal) operates in a WPS enrollee mode, and controls the Wi-Fi device to access the discovered AP (e.g., an AP whose WPS session of the WPS registrar mode is enabled). In other words, in steps S305 and S306, the controller 210 provides the legacy Wi-Fi function for accessing an AP and providing wireless communication.

As described in steps S304 through S306, an exemplary embodiment of the present invention may provide a method and an apparatus capable of connecting both legacy Wi-Fi and Wi-Fi Direct using the WPS connection method, and may also provide the compatibility with the legacy Wi-Fi that supports only AP access with the WPS connection method.

If it is determined in step S304 that a device having GO rights (e.g., a device whose GO mode is enabled) has been discovered, the controller 210 determines GO of Wi-Fi Direct and forms a Wi-Fi P2P group according to the determination results, in step S307.

An exemplary embodiment of the present invention is to utilize the WPS connection method (e.g., a PBC scheme), which was applied only during use of legacy Wi-Fi, even during use of Wi-Fi Direct. Accordingly, if WPS connection is requested, the controller 210 automatically enables the GO mode of Wi-Fi Direct in step S302. If an AP is discovered in step S304, the controller 210 provides a legacy Wi-Fi function with WPS connection, and if GO is discovered in step S304, the controller 210 provides a Wi-Fi Direct function.

Therefore, if it is determined in step S304 that a device having GO rights is discovered, a GO selection process for determining which device of the proposed portable terminal and the discovered device (having GO rights) will operate as GO should be performed.

In the exemplary GO setting process described in conjunction with FIG. 1, GO is determined by comparing intent values of Wi-Fi devices. However, the portable terminal has already had GO rights in step S302, and the GO device discovered in step S304 literally has GO rights. Therefore, in step S307, GO needs to be reset between two GO devices.

Wi-Fi Direct standard provides that an SSID name of the Wi-Fi device should have a prefix of Direct-xy so that an AP during operation of GO may be distinguished from an AP during use of legacy Wi-Fi.

Therefore, in step S307, the controller 210 compares Direct-xy which is a prefix attached in front of an SSID name and uses it in determining GO. The controller 210 determines GO by comparing 'xy' values because the two letters 'xy' in the prefix Direct-xy have variable values.

For example, assuming that the proposed portable terminal has an SSID name called direct-10 by acquiring GO rights in step S302 and the device discovered in step S304 to have GO rights has an SSID name called direct-09, the controller 210 may set GO by comparing the value '10' with the value '09'. For example, if it is provided that a device with a greater 'xy' value is set to have GO rights, the portable terminal having the value '10' acquires GO rights, while the discovered device having the value '09' acquires GC rights. Although it is assumed herein that the device with a greater prefix has GO rights, it will be understood by those of ordinary skill in the art that a device with a lesser prefix may have GO rights by a modification of an exemplary embodiment of the present invention.

If GO is determined by the comparison of prefixes, a Wi-Fi P2P group of Wi-Fi Direct is formed according thereto. For example, if the portable terminal acquires GO rights, the controller 210 maintains the WPS session so that the portable terminal may operate as a registrar, and the device that is discovered in step S304 to have GO rights is reset to have GC rights and operates as an enrollee.

In other words, the portable terminal has GO rights, and the device, which was discovered in step S304 to have GO rights, has GC rights. Thus, they form a Wi-Fi P2P group by exchanging credentials with each other.

As is apparent from the foregoing description, despite the common use of Wi-Fi Direct, there are still many devices (e.g., smart phones) supporting only legacy Wi-Fi. A device supporting the Wi-Fi Direct function may connect with a device not supporting the Wi-Fi Direct function with the WPS connection, contributing to the improvement of the compatibility between the devices.

In addition, by enabling the use of the Wi-Fi Direct function with the WPS connection, exemplary embodiments of the present invention may ensure compatibility with the WPS connection for legacy Wi-Fi.

The Wi-Fi Direct connection function provided simply by enabling WPS may reduce the connection time, compared to the Wi-Fi Direct connection method of the related art of making a Wi-Fi Direct connection to the device corresponding to the connection target through the device discovery, service discovery and group creation processes.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
a processor comprising processing circuitry; and
memory storing instructions;
wherein the instructions that, when executed by the processor individually or collectively, cause the electronic device to:
in a state that the electronic device enables and is configured as a group owner (GO) of a first Wi-Fi group, discover an external electronic device,
identify a first value, related to a group owner of a second Wi-Fi group, of the external electronic device, and
based on the first value of the external electronic device, disable the group owner of the first Wi-Fi group.

2. The electronic device of claim 1, wherein the instructions that, when executed by the processor individually or collectively, cause the electronic device to:
compare the first value with a second value, related to the group owner of the first Wi-Fi group, of the electronic device, and
based on the comparing the first value and the second value, disable the group owner of the first Wi-Fi group.

3. The electronic device of claim 2, wherein the instructions that, when executed by the processor individually or collectively, cause the electronic device to:
when the first value is greater than the second value of the electronic device, disable the group owner of the first Wi-Fi group.

4. The electronic device of claim 2, wherein the instructions that, when executed by the processor individually or collectively, cause the electronic device to:
when the first value is less than the second value of the electronic device, maintain the group owner of the first Wi-Fi group.

5. The electronic device of claim 1, wherein the first Wi-Fi group includes only the electronic device.

6. The electronic device of claim 1, wherein the instructions that, when executed by the processor individually or collectively, cause the electronic device to:
disable the group owner of the first Wi-Fi group without a group owner negotiation with the external electronic device.

7. The electronic device of claim 1, wherein the instructions that, when executed by the processor individually or collectively, cause the electronic device to:
based on information obtained through the discovering, identify the first value of the external electronic device.

8. The electronic device of claim 1, wherein the instructions that, when executed by the processor individually or collectively, cause the electronic device to:
join the second Wi-Fi group after disabling the group owner of the electronic device.

9. The electronic device of claim 1, wherein the instructions that, when executed by the processor individually or collectively, cause the electronic device to:
in response to identifying that the first value of the external electronic device is related to enabling a group client of a second Wi-Fi group, maintain the group owner of the first Wi-Fi group.

10. A method for connecting to a wireless-fidelity (Wi-Fi) network in an electronic device, the method comprising:
in a state that the electronic device enables and is configured as a group owner (GO) of a first Wi-Fi group, discovering an external electronic device;

identifying a first value, related to a group owner of a second Wi-Fi group, of the external electronic device; and based on the first value of the external electronic device, disabling the group owner of the first Wi-Fi group.

11. The method of claim 10, further comprising:

comparing the first value with a second value, related to the group owner of the first Wi-Fi group, of the electronic device, and wherein the disabling the group owner of the first Wi-Fi group comprises, based on the comparing the first value and the second value, disabling the group owner of the first Wi-Fi group.

12. The method of claim 11, wherein the disabling the group owner of the first Wi-Fi group comprises, when the first value is greater than the second value of the electronic device, disabling the group owner of the first Wi-Fi group.

13. The method of claim 11, further comprising:

when the first value is less than the second value of the electronic device, maintaining the group owner of the first Wi-Fi group.

14. The method of claim 10, wherein the first Wi-Fi group includes only the electronic device.

15. The method of claim 10, wherein the disabling the group owner of the first Wi-Fi group comprises, disabling the group owner of the first Wi-Fi group without a group owner negotiation with the external electronic device.

16. The method of claim 10, wherein the identifying the first value of the external electronic device comprising, based on information obtained through the discovering, identifying the first value of the external electronic device.

17. The method of claim 10, further comprising:

joining the second Wi-Fi group after disabling the group owner of the first Wi-Fi group.

18. The method of claim 10, further comprising:

in response to identifying that the first value of the external electronic device is related to enabling a group client of a second Wi-Fi group, maintaining the group owner of the electronic device.

19. One or more non-transitory computer-readable storage media storing computer-executable instructions that, when executed by at least one processor of an electronic device, cause the electronic device to perform operations, the operations comprising:

in a state that the electronic device enables and is configured as a group owner (GO) of a first Wi-Fi group, discovering an external electronic device;

identifying a first value, related to a group owner of a second Wi-Fi group, of the external electronic device; and based on the first value of the external electronic device, disabling the group owner of the first Wi-Fi group.

* * * * *